United States Patent [19]

Minema et al.

[11] Patent Number: 4,819,060

[45] Date of Patent: Apr. 4, 1989

[54] AUTOMATIC WHITE BALANCE CIRCUIT FOR COLOR TV CAMERAS HAVING MEANS FOR INTERRUPTING WHITENING OPERATION UPON VIEWING MONO-COLORED NON-WHITE OBJECT FIELDS

[75] Inventors: Ikumi Minema, Funabashi; Yoshiro Hieda, Yokohama, both of Japan

[73] Assignee: Victor Company of Japan, Ltd., Yokohama, Japan

[21] Appl. No.: 93,947

[22] Filed: Sep. 8, 1987

[30] Foreign Application Priority Data

Sep. 8, 1986 [JP] Japan ............................ 61-137754[U]

[51] Int. Cl.$^4$ .............................................. H04N 9/73
[52] U.S. Cl. .................................................... 358/29
[58] Field of Search ............................................ 358/29

[56] References Cited

U.S. PATENT DOCUMENTS

| Re. 28,774 | 4/1976 | Kubota et al. | 358/29 C |
|---|---|---|---|
| 3,772,462 | 11/1973 | Schneider | 358/29 C |
| 3,786,177 | 1/1974 | Bazin | 358/29 C |
| 4,219,841 | 8/1980 | Nishimura et al. | 358/29 C |
| 4,454,532 | 6/1984 | Itani et al. | 358/29 C |

FOREIGN PATENT DOCUMENTS

| 189793 | 10/1984 | Japan | 358/29 |
|---|---|---|---|
| 90490 | 5/1985 | Japan | 358/29 |
| 180394 | 9/1985 | Japan | 358/29 |
| 218993 | 11/1985 | Japan | 358/29 |

*Primary Examiner*—John W. Shepperd
*Attorney, Agent, or Firm*—Holman & Stern

[57] ABSTRACT

A circuit arrangement comprises a process amplifier which inputs primary color signals and a luminance signal from an image sensor and which outputs color difference signals each corresponding to a difference between each of said primary color signals and said luminance signal with an amplitude determined by gain control signals; a balance control circuit which generates the gain control signals responsive to said color difference signals to control the process amplifier so as to keep a white balance; and a detecting circuit for detecting a condition where a field of vision of the image sensor is substantially occupied with one color, the detecting circuit producing and supplying a hold signal to the balance control circuit while the detection of the condition is made. When the hold signal is supplied to, the balance control circuit holds each of the gain control signals to a value at a moment right before the hold signal is supplied, and keeps holding until the hold signal stops.

4 Claims, 3 Drawing Sheets

LEVEL DETECTION CIRCUIT 9

AUTOMATIC WHITE BALANCE CIRCUIT FOR COLOR TV CAMERAS HAVING MEANS FOR INTERRUPTING WHITENING OPERATION UPON VIEWING MONO-COLORED NON-WHITE OBJECT FIELDS

BACKGROUND OF THE INVENTION

This invention relates to a white balance circuit arrangement for a color TV camera and, more particularly, to a circuit arrangement holding a white balance in a color TV camera having a solid-state image sensor.

Since a plurality of primary color signals are combined to form a picture in a color TV camera, it requires a white balance circuit to adjust a gain of each primary color signal so as to form a picture with proper coloring.

FIG. 1 shows a block diagram of a conventional white balance circuit. In the circuit an image sensor 1 outputs signal R, signal B, and signal Y depending on the incident light. The signals R and B, which are alternatively outputted as a line sequential signal, indicate primary colors and the signal Y indicates luminance. These signals are amplified through a preamplifier 2 and fed into a process amplifier 3 where color difference signals R-Y and B-Y are generated. An encoder 4 encodes the color difference signals so as to provide an output terminal 5 with a color video signal applicable, for example, to the NTSC system.

The signals R-Y and B-Y are also fed into a balance control circuit 6 where gain control signals $V_R$ and $V_B$ are generated. The process amplifier 3 amplifies inputted signals R, B and Y based on values of the gain control signals $V_R$ and $V_B$. Thus the circuit 6 can hold a white balance by properly controlling values of signals $V_R$ and $V_B$.

An initial setting of the balance control circuit 6 is made at each time when a white balance switch (not shown) is momentarily turned on. In other words, in order to make the initial setting, a cameraman usually directs the camera to a white object and turns on manually the white balance switch, thus setting a balanced condition, and thereafter, the gain of the process amplifier 3 is fixed to keep the balanced condition. However, since the gain condition set by the initial setting is fixed until the next time the white balance switch in manipulated, a desirable white balance is not always assured for objects being viewed under ambient lighting having different color temperatures between manipulations of the white balance switch. On the other hand, in an automatic white balance system where a white balance operation is always active for taking different color temperature scans, the image obtained tends to become whitened and looks unnatural when the image sensor is directed to a mono-colored non-white object. That is a drawback of the circuit shown in FIG. 1.

FIG. 2 shows a block diagram of another conventional white balance circuit. The circuit is provided with a color temperature sensor 7 which monitors the objects continually and gives a color temperature signal CT to a balance control circuit 8. The circuit 8 controls values of signals $V_R$ and $V_B$ based on the color temperature signal CT, thus holding a white balance continually.

In the circuit illustrated in FIG. 2, there are drawbacks such that the device becomes bulky because it is equipped with the color temperature sensor 7, and that it needs a time consuming gain adjustment to compensate the offset voltage of the diode in the sensor 7.

SUMMARY OF THE INVENTION

An object of the present invention is to provide a white balance circuit arrangement for a color TV camera, wherein a natural color image is always obtained by preventing the image from being whitened, even when a view field is occupied with one color other than white.

In a white balance circuit arrangement for a color TV camera for modifying inputted primary color signals, the foregoing object is accomplished by providing: a process amplifier which inputs primary color signals and a luminance signal from an image sensor and which outputs color difference signals each corresponding to a difference between each of the primary color signals and said luminance signal, amplitudes of the color difference signals being determined by gain control signals; a balance control circuit which generates the gain control signals responsive to the color difference signals to control the process amplifier so as to keep a white balance; and means for detecting a condition where a field of vision of the image sensor is substantially occupied with one color, the detecting means producing and supplying a hold signal to the balance control circuit while the detection of the condition is made; and thus when the hold signal is supplied to, making the balance control circuit hold each of the gain control signals to a value at a moment right before the hold signal is supplied and keep holding until the hold signal stops.

DESCRIPTION OF THE PREFERRED EMBODIMENT

Figure 1:
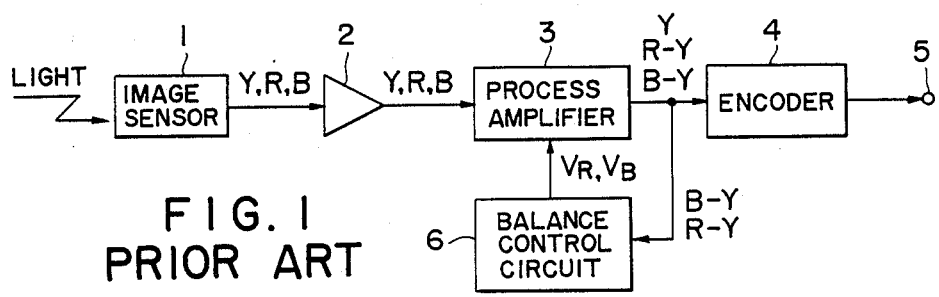
FIG. 1 shows a block diagram of a conventional white balance circuit arrangement.

Referring to FIGS. 3 through 8, preferred embodiments of this invention will be described in detail. In an embodiment illustrated in FIG. 3, an image sensor 1 outputs signal R, signal B, and signal Y in response to the incident light and these signals are amplified through a pre-amplifier 2 and fed into a process amplifier 3 where color difference signals R-Y and B-Y are generated as described with reference to conventional circuits. An encoder 4 encodes the color difference signals so as to provide an output terminal 5 with a color video signal.

The signals R-Y and B-Y are also fed into a balance control circuit 10 where gain control signals $V_R$ and $V_B$ are generated. The process amplifier 3 amplifies inputted signals responsive to the gain control signals $V_R$ and $V_B$. Thus, the circuit 6 holds a white balance by properly adjusting values of signals $V_R$ and $V_B$.

As a start-up operation, when the power switch (not shown) for the color TV camera is turned on, the process amplifier 3 is supplied momentarily with the gain control signals $V_R$ and $V_B$ having respectively predetermined values selected for a predetermined scene which are generated by the balance control circuit 10 disregarding the inputted signals of R-Y and B-Y. Except for this start-up moment, the balance control circuit 10 continues to operate in response to the signals R-Y and B-Y fed from the process amplifier 3 as long as the power switch is kept turned on.

The characterized feature in the embodiment is to provide a level detection circuit 9. The circuit 9 has a function to output signal HOLD to the balance control circuit 10, when the image sensor 1 is directed to a mono-colored object so that a field of vision in the image sensor 1 is occupied substantially by the mono-colored object. When the signal HOLD is given, the balance control circuit 10 freezes values of the signals $V_R$ and $V_B$ which are being generated right before the moment of the signal HOLD just being given.

Figure 2:
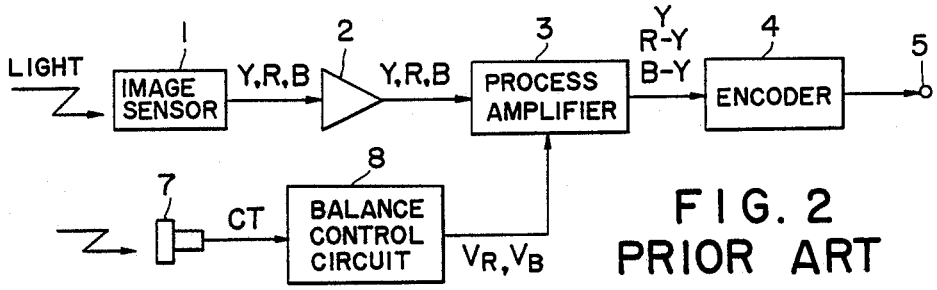
FIG. 2 shows a block diagram of another conventional white balance circuit arrangement with a color temperature sensor.
Figure 3:
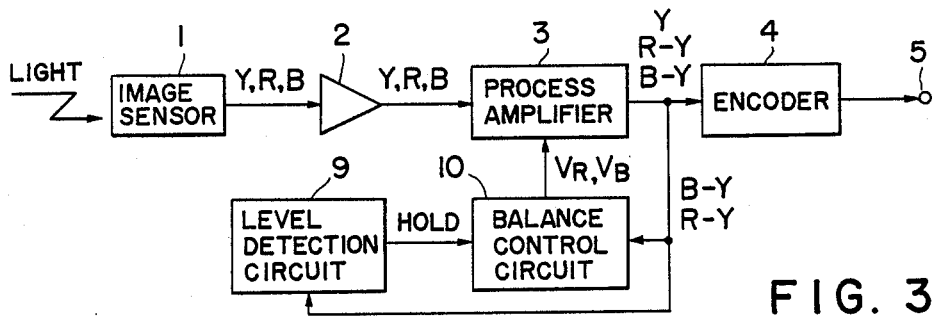
FIG. 3 shows a block diagram of a white balance circuit arrangement according to the first embodiment of the present invention.

The operation of the circuit illustrated in FIG. 3 is as follows. In a regular condition where a field of vision of the image sensor 1 contains several different colors, the level detection circuit 9 outputs no signal, and thus the balance control circuit 10 operates in the regular mode as described regarding the conventional circuit. However, in a condition where a field of vision of the image sensor 1 is substantially occupied by a single color (hereinafter, referred to as a mono-color condition), the level detection circuit 9 outputs the signal HOLD, and thus the balance control circuit 10 operates in the mono-color mode in which the signals $V_R$ and $V_B$ are frozen to their values at the moment right before the signal HOLD is given. Thus gains in the process amplifier 3 remain holding previous values with which the white balance has been kept as before. Therefore, an obtained image from the output terminal 5 does not become whitened, thus looking with natural coloring. Since the circuit shown in FIG. 3 does not need a color temperature sensor, which the conventional circuit in FIG. 2 comprises, it is available to make an entire device small and there is no need to make adjustment for a color temperature sensor.

Figure 5:
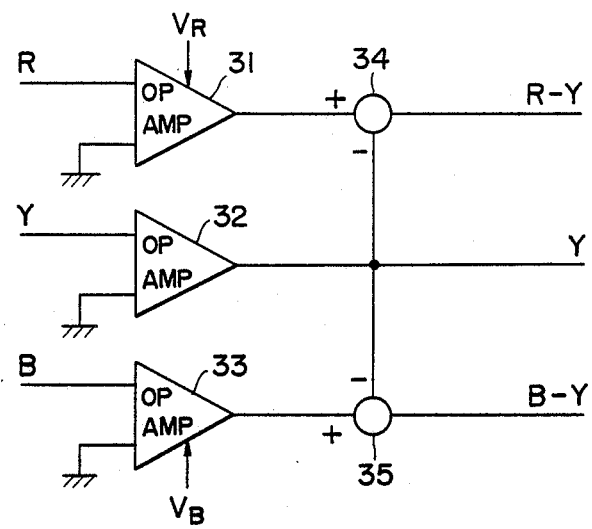
FIG. 5 shows a circuit diagram, in detail, of a process amplifier of the arrangement according to the invention shown in FIGS. 3 and 4.

FIG. 5 shows a circuit diagram of the process amplifier 3 of the device in FIG. 3 according to the invention. The circuit comprises operational amplifiers 31, 32 and 33. The primary color signals R and B, and signal Y obtained from the image sensor 1 through the preamplifier 2 are given to each of the operational amplifiers 31, 32 and 33 at one of input terminals. The other input terminals are grounded. Thus amplified signals of R, Y and B are outputted from each of the operational amplifiers 31, 32 and 33. The circuit also comprises subtractors 34 and 35 where subtraction is carried out. In subtractor 34 subtraction R-Y is carried out and, in subtractor 35 subtraction B-Y is carried out. Thus, output signals R-Y, B-Y and Y are obtained.

Amplifying gains in operational amplifiers 31 and 33 are determined based on gain control signals $V_R$ and $V_B$. Therefore absolute values of analogue signals R-Y and B-Y are controlled by gain control signals $V_R$ and $V_B$, thus a white balance being maintained.

Figure 6:
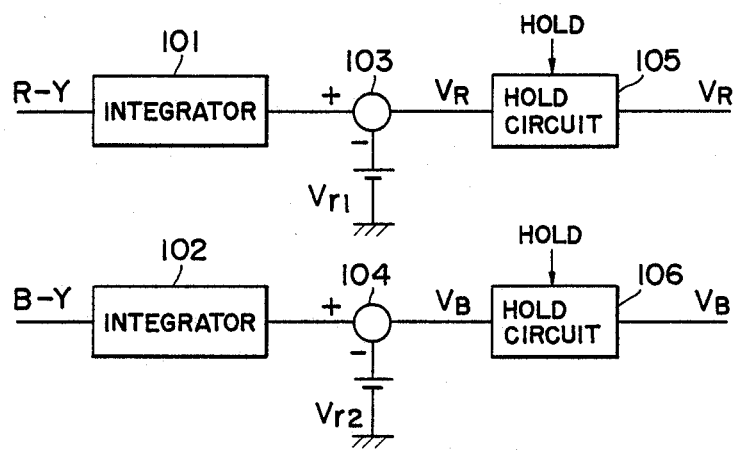
FIG. 6 shows a circuit diagram, in detail, of a balance control circuit of the arrangement according to the invention shown in FIGS. 3 and 4.

FIG. 6 shows a circuit diagram of the balance control circuit of the circuit arrangement shown in FIG. 3 according to the invention. The circuit comprises integrators 101 and 102, subtractors 103 and 104, and hold circuits 105 and 106. Signals R-Y and B-Y, which are obtained from the process amplifier 3, are integrated by the integrators 101 and 102. The subtractors 103 and 104 output gain control signals $V_R$ and $V_B$, respectively, which correspond to the differences between the integrated signals from integrators 101 and 102 and the predetermined reference signals $V_{r1}$ and $V_{r2}$, respectively. The resultant gain control signals $V_R$ and $V_B$ are given to the process amplifier 3 through hold circuits 105 and 106, respectively. The hold circuits simply pass the inputted signals $V_R$ and $V_B$, unless the signal HOLD is given. When the signal HOLD is given, the circuits 105 and 106 hold their output signals to values at a time right before the signal HOLD is given.

Figure 7:
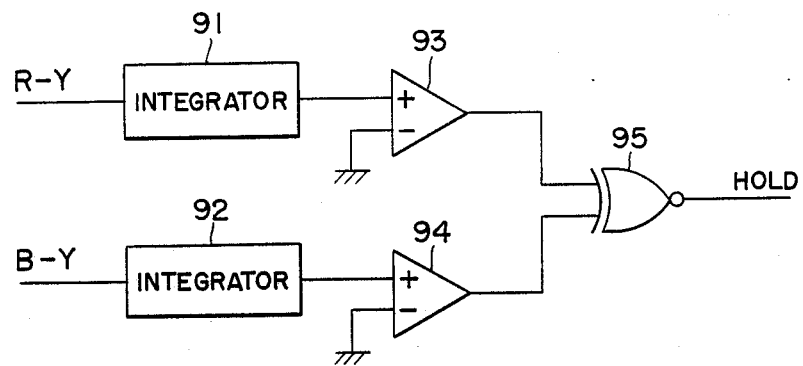
FIG. 7 shows a circuit diagram, in detail, of a level detection circuit of the arrangement according to the invention shown in FIG. 3.

FIG. 7 shows a circuit diagram of the level detection circuit 9 of the device shown in FIG. 3 according to the invention. The circuit comprises integrators 91 and 92, comparators 93 and 94, and an exclusive OR gate 95 having an output inversed. The signals R-Y and B-Y are obtained from the process amplifier 3 and are integrated by the integrators 91 and 92, respectively. The integrated signals are compared with a ground level in the comparators 93 and 94 which output a logical value 1 when the input signal is positive or a logical value 0 when it is negative. The exclusive OR gate 95 outputs a signal HOLD only when both its logical inputs are logical 1 or logical 0.

Figure 8:
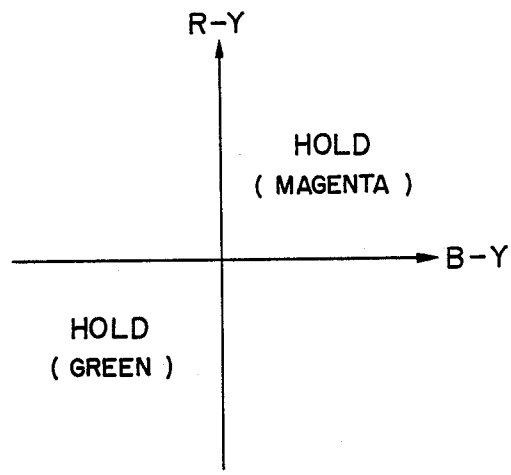
FIG. 8 shows a coordinate plane explaining the operation of the level detection circuit shown in FIG. 7.

The operation of the circuit 9 is represented by a coordinate plane described in FIG. 8. The exclusive OR gate 95 outputs a signal HOLD when a coordinate location of the input signals is plotted in the first quadrant or the third quadrant of the coordinate plane. The first quadrant corresponds to magenta and the third quadrant to green. It is experimentally known that when an average coloring in a view field of a camera locates in a magenta or green area in the coordinate plane, the field of vision is substantially occupied by one color either of magenta or green. Therefore, in the circuit shown in FIG. 7, "to output signal HOLD" means that the field of vision of the camera is considered to be occupied by one color. Then the signal HOLD freezes the gain control signals $V_R$ and $V_B$ to previous values.

Figure 4:
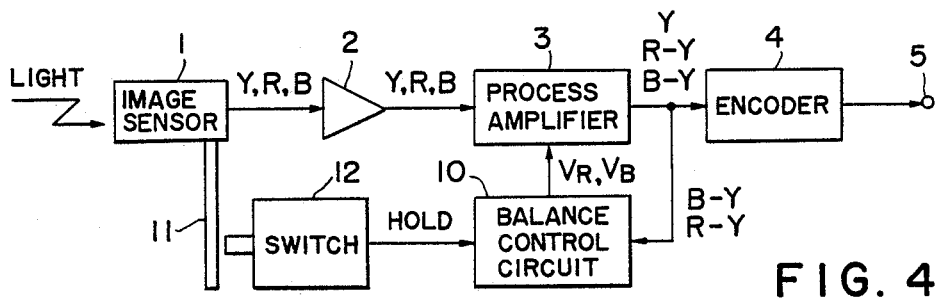
FIG. 4 shows a block diagram of a white balance circuit arrangement according to the second embodiment of the present invention.

FIG. 4 shows a circuit diagram of another embodiment of the invention. In the former embodiment, the level detection circuit 9 outputs a signal HOLD depending on a coordinate location of the signals B-Y and R-Y. In this embodiment, pulling a close up lever 11 turns a switch 12 on, and the switch 12 outputs the signal HOLD to the balance control circuit 10. The close-up lever 11 is mechanically linked to the lense system for the image sensor 1. When a cameraman pulls the lever 11, the lense system moves to a proper position to close-up an object within one meter in distance, for example. The lever 11 returns to its original position by a spring when it is released. Thus the switch 12 is kept to be on and to output a signal HOLD until the lever 11 is released. Accordingly the balance control circuit 10 holds the gain control signals $V_R$ and $V_B$ at previous values until the lever 11 is released.

When a regular scene is taken where the object is located in some distance, the lever 11 is not pulled. Therefore, the signal HOLD is not generated and the balance control circuit 10 does not hold the values of the signals and $V_R$ and $V_B$, thus the same operation as it is in the conventional device being carried out. On the other hand, when a close-up scene is taken, the lever 11 is pulled to move the lens system so as to zoom in or focus on an object in a short distance. Thus the signal HOLD is generated and the balance control circuit 10 does hold the values of the signals and $V_R$ and $V_B$ at previous values. The values are held until the lever 11 is released to take another regular scene.

When a close-up scene is taken, chances are that the field of vision is being occupied substantially by one color because only a part of an object is expandedly visible in the field of vision. For example, when a human face is focused, the field of vision is occupied by the skin color. In the close-up scene like that, the picture obtained by the conventional circuit arrangement is whitened as described before, but the picture obtained by the circuit arrangement according to the invention shown in FIG. 4 is not whitened and looks natural because the gain control signals and $V_R$ and $V_B$ are fixed at the values preceding the close-up scene.

This invention may be practiced or embodied in still other ways without departing from the spirit or essential characteristics thereof. For instance, while in the illustrated preferred embodiments, the level detection circuit 9 or the combination of the close-up lever 11 and switch 12 is used, the other means may alternately be used as far as it has a function to detect the fact that a current field of vision of a camera is occupied by substantially one color.

What is claimed is:

1. An automatic white balance circuit arrangement for a color TV camera having an image sensor which outputs two primary color signals of red and blue respectively and a luminance signal in response to light incident on a field of vision of said image sensor, comprising:
    (a) process amplification means for inputting said two primary color signals and said luminance signal from the image sensor and for outputting color difference signals corresponding to a difference between each of said two primary color signals and said luminance signal, amplitudes of said color difference signals being determined by gain control signals inputted to said process amplification means;
    (b) detection means for detecting a condition where a field of vision of said image sensor is substantially occupied with generally magenta or green, producing a hold signal while the detection of said condition is made, and outputting said hold signal during the detection of said condition; and
    (c) balance control means for generating said gain control signals responsive to said color difference signals to control said process amplification means so as to maintain a white balance operation active in case said field of vision is occupied with colors other than generally magenta or green, and which holds each of said gain control signals to a value thereof at a moment right before said hold signal is supplied on the basis of said hold signal in case said field of vision is occupied with generally magenta or green, and which keeps holding each of said gain control signals at said value thereof until said hold signal stops.

2. The automatic white balance circuit arrangement for a color TV camera according to claim 1, wherein said balance control means comprises:
    an intergrator inputting a color difference signal;
    a subtractor generating a gain control signal as a difference between said color difference signal and a predetermined value; and
    a hold circuit for holding said gain control signal to a value thereof at a moment right before the hold signal is supplied until said hold signal stops.

3. An automatic white balance circuit arrangement for a color TV camera having an image sensor which outputs two primary color signals of red and blue respectively and a luminance signal in response to light incident on a field of vision of said image sensor, comprising:
    process amplification means for inputting said two primary color signals and said luminance signal from the image sensor and for outputting color difference signals corresponding to a difference between each of said two primary color signals and said luminance signal, amplitudes of said color difference signals being determined by gain control signals input to said process amplification means;
    detection means for detecting a condition where a field of vision of said image sensor is substantially occupied with generally magenta or green, for producing a hold signal while the detection of said condition is made, and for outputting said hold signal during the detection; and
    balance control means for generating said gain control signals responsive to said color difference signals to control said process amplification means so as to maintain a white balance operation active in case said field of vision is occupied with colors other than generally magenta or green, and for holding said respective gain control signals at respective values thereof at a moment right before said hold signal is supplied, on the basis of said hold signal, in case said field of vision is occupied with generally magenta or green, and for holding said gain control signals at said respective values thereof until said hold signal stops.
    wherein said detection means further comprises;
    a pair of integrators each of which inputs the a respective color difference signal;
    a pair of comparators each of which compares an integrated signal output from a respective one of said integrators with a zero level and each of which generates a positive or negative output, respectively; and
    an exclusive OR gate receiving outputs from said pair of comparators and outputting the hold signal when the outputs of said comparators are both positive or negative.

4. An automatic white balance circuit arrangement for a color TV camera for modifying inputted primary color signals from an image sensor of said camera, comprising:
    process amplification means for inputting two primary color signals and a luminance signal from the image sensor and for outputting color difference signals each corresponding to a difference between each of said primary color signals and said luminance signal, amplitudes of said color difference signals being determined by gain control signals input to said process amplification means;

detection means for detecting a condition where a field of vision of said image sensor is likely to be substantially occupied with one color, for producing a hold signal while the detection of said condition is made, and for outputting said hold signal during the detection; and balance control means for generating said gain control signals responsive to said color difference signals to control said process amplification means so as to maintain a white balance in case said field of vision is occupied with various colors, and for holding said respective gain control signals at respective values thereof at a moment right before said hold signal is supplied, on the basis of said hold signal, and for holding said gain control signals at said respective values thereof until said hold signal stops;

wherein said detection means comprises:

a close-up lever operable for moving lenses in the image sensor to form a close-up image of an object in the field of vision of the image sensor; and a switch to cause generation of the hold signal while said close-up lever is in an operated position forming a close-up image of the field of vision of the image sensor.

* * * * *